United States Patent [19]
Antol et al.

[11] Patent Number: 4,518,843
[45] Date of Patent: May 21, 1985

[54] LASER LENS AND LIGHT ASSEMBLY

[75] Inventors: Ronald F. Antol, North Huntingdon Township, Westmoreland County; Ralph W. Kalkbrenner, Irwin; Richard M. Kobuck, Delmont, all of Pa.

[73] Assignee: Westinghouse Electric Corp., Pittsburgh, Pa.

[21] Appl. No.: 414,205

[22] Filed: Sep. 1, 1982

[51] Int. Cl.³ .............................................. B23K 27/00
[52] U.S. Cl. ......................... 219/121 LC; 219/121 FS
[58] Field of Search ................ 215/121 LC, 121 LD, 215/121 LG, 121 LH, 121 LJ, 121 LN, 121 LP, 121 LQ, 121 FS, 121 L, 121 LM, 121 LR

[56] References Cited

U.S. PATENT DOCUMENTS

| | | | |
|---|---|---|---|
| 3,383,491 | 5/1968 | Muncheryan | 219/121 LR X |
| 3,569,660 | 3/1971 | Houldcroft | 219/121 FS X |
| 4,000,391 | 12/1976 | Yeo | 219/121 LT X |

Primary Examiner—C. L. Albritton
Attorney, Agent, or Firm—D. E. Erickson

[57] ABSTRACT

Apparatus is disclosed for laser machining a work piece comprising a laser lens adapted to be releasably mounted to permit cleaning of the lens to remove any debris collected thereon during laser machining. The mounting includes a cylindrical base for defining a path along which the laser beam emitted by the laser source is directed onto the work piece, and a mounting member for mounting the laser lens with respect to the cylindrical base and adapted to be removably mounted on the cylindrical base in a manner whereby the lens is disposed to a certain position with respect to the cylindrical base. To this end, there is included a locking member engaging the cylindrical base and biasing the mounting member and its laser lens to the certain position with respect to the cylindrical base.

17 Claims, 10 Drawing Figures

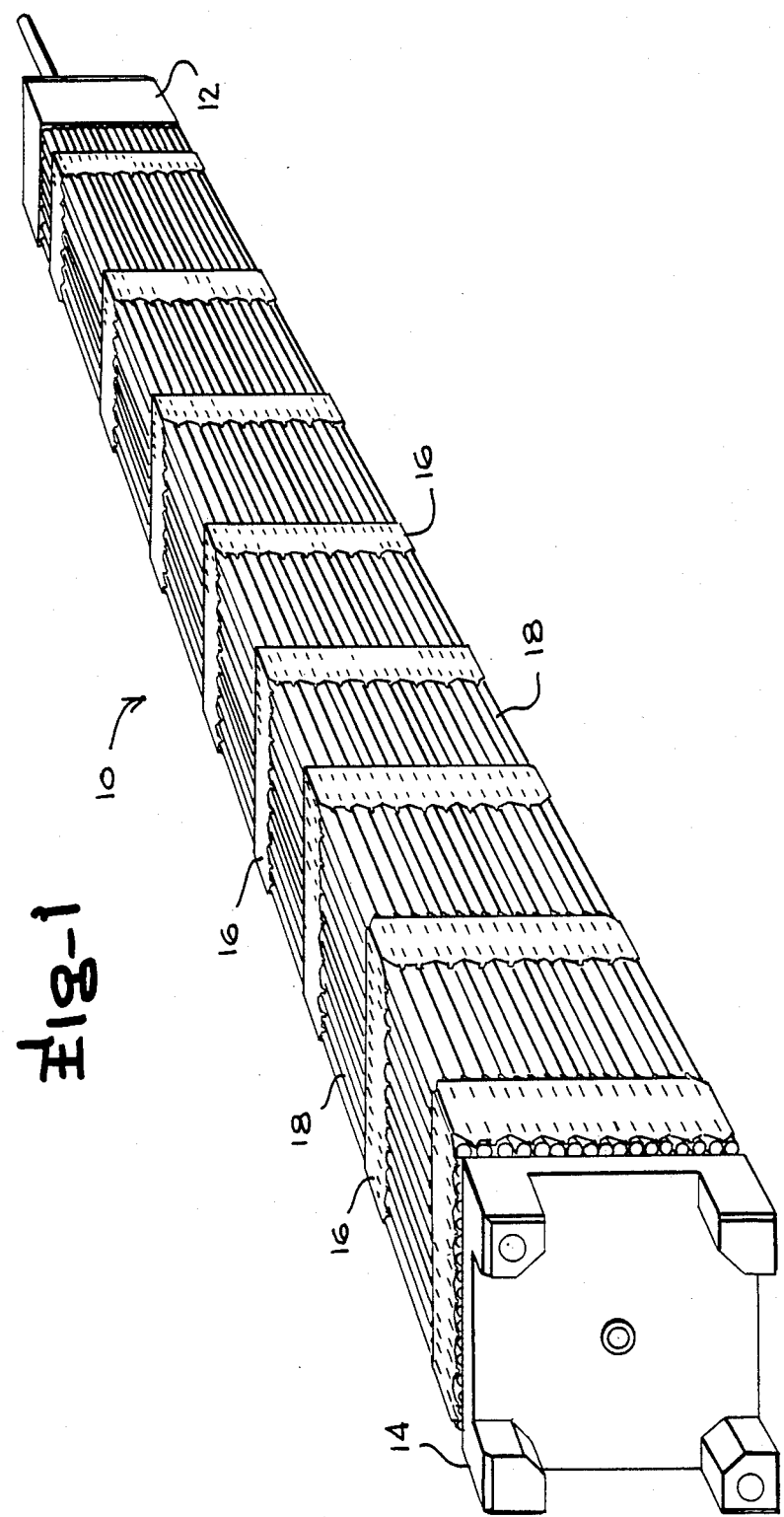

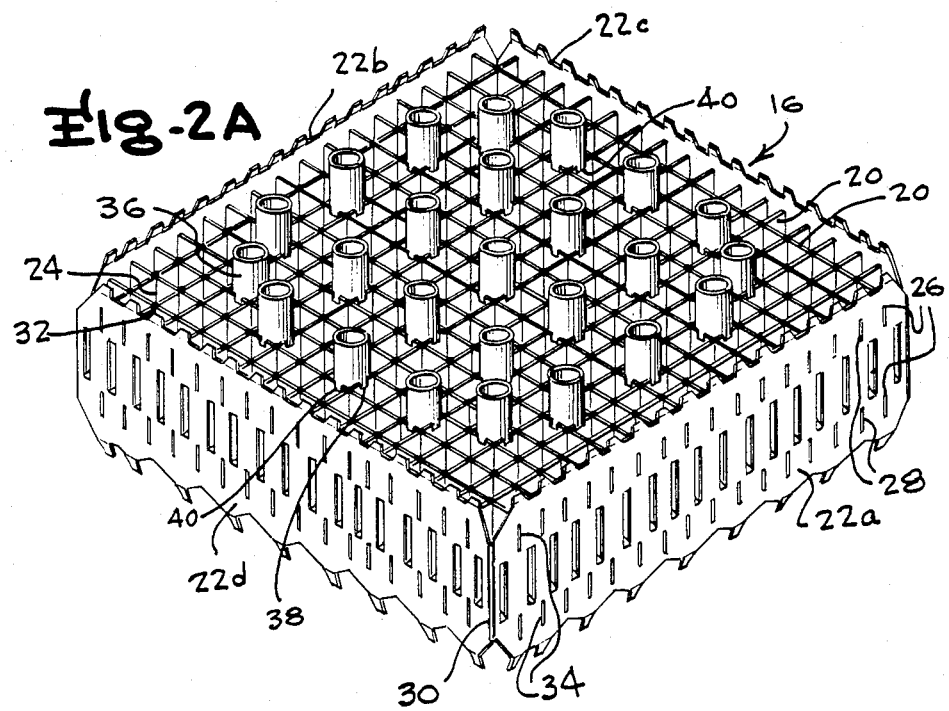
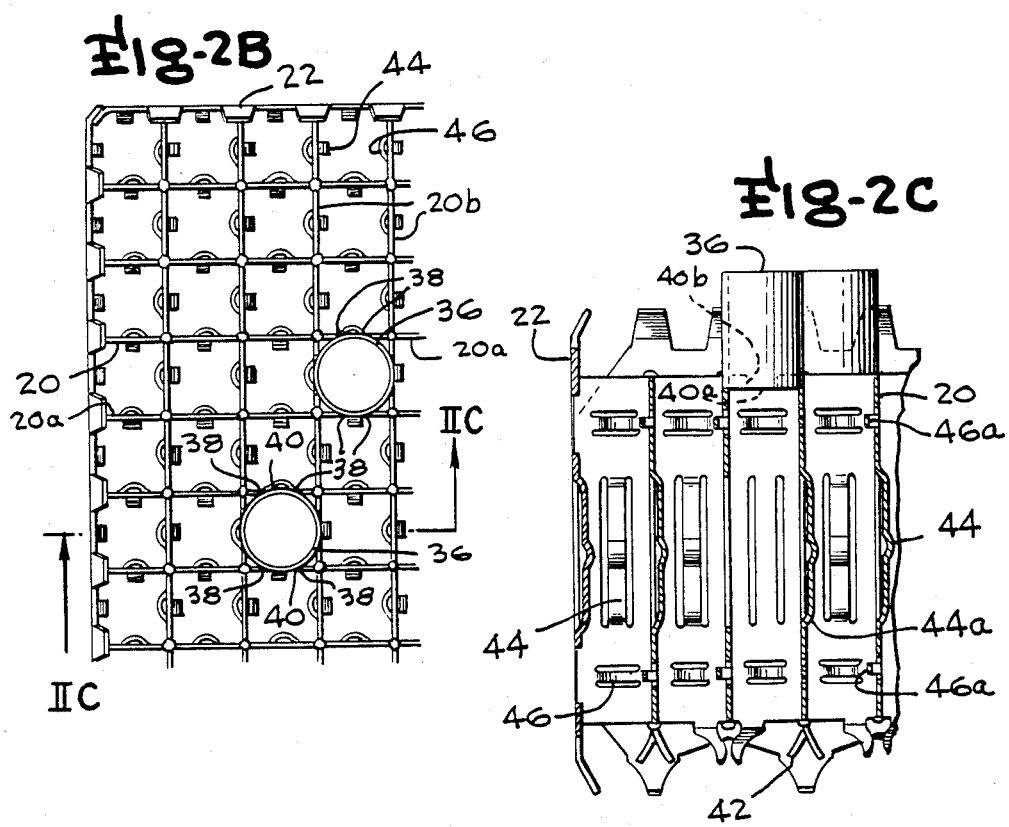

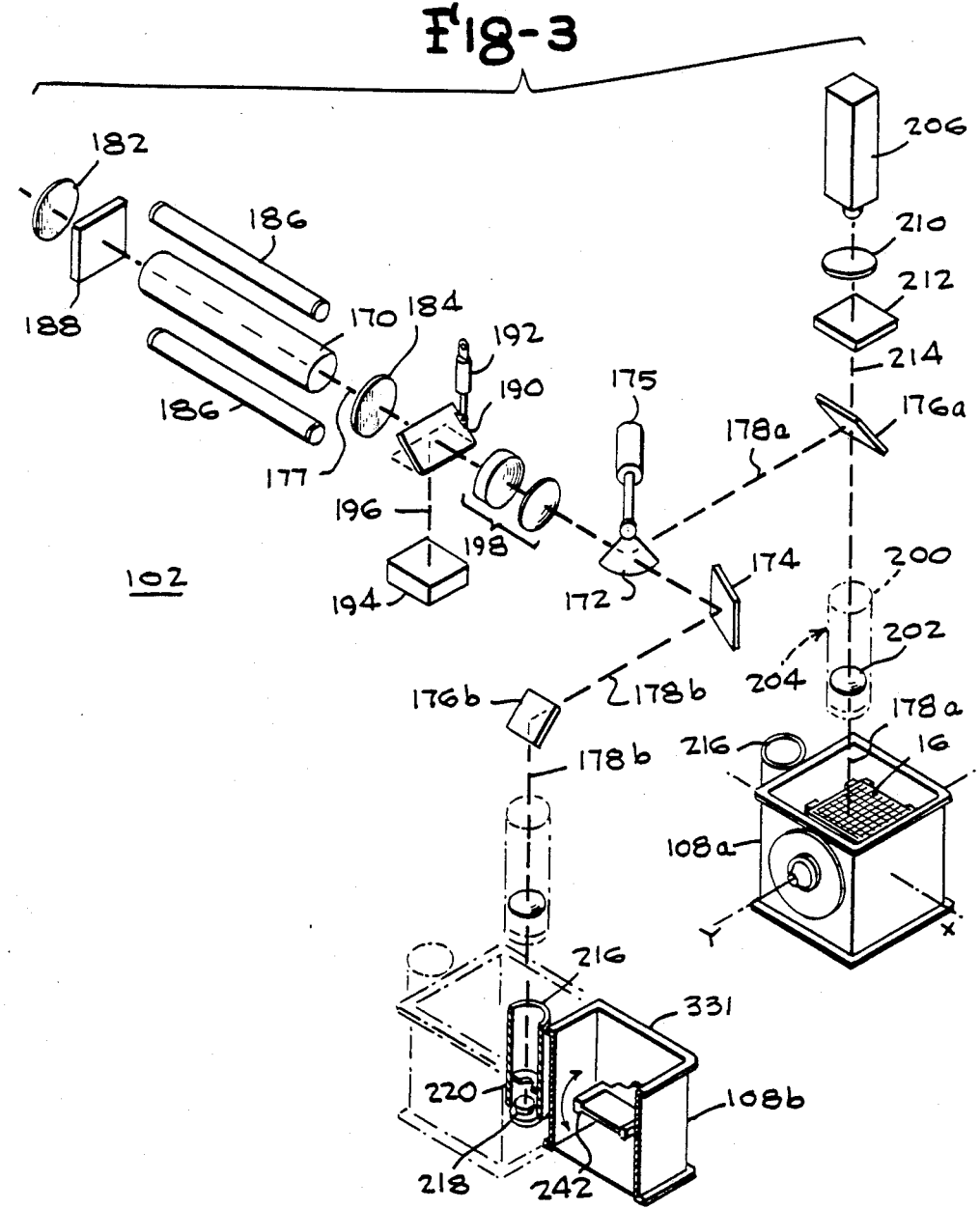

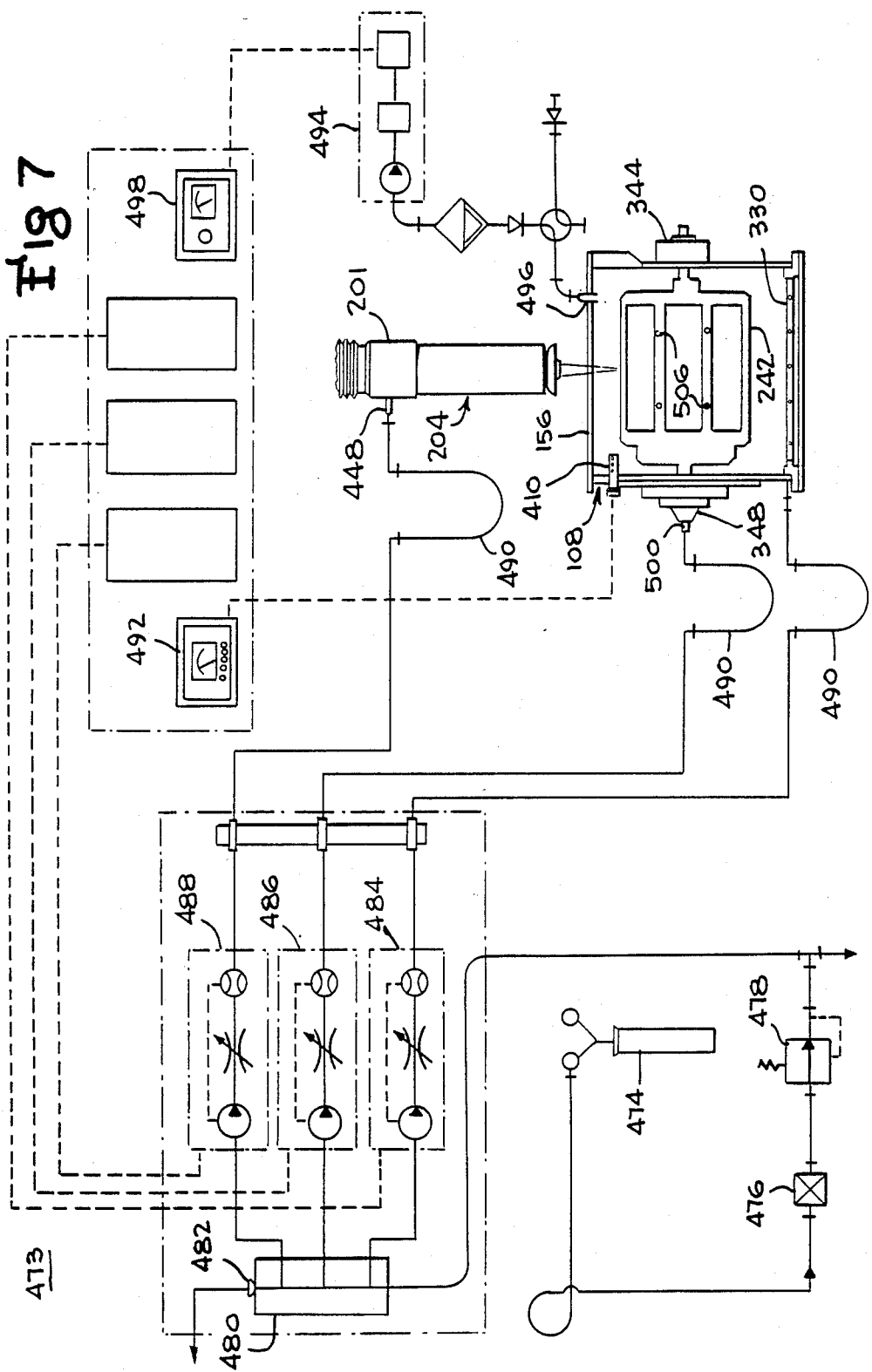

LASER LENS AND LIGHT ASSEMBLY

CROSS-REFERENCE TO COPENDING APPLICATIONS

Attention is drawn to the following copending, commonly assigned applications, all/each filed on even date and incorporated specifically by reference into the instant specification:

(1) "FUEL GRID WITH SLEEVES WELDED IN NOTCHED GRID STRAPS", by R. Duncan, Ser. No. 414,232; filed 9/1/82;

(2) "PULSED LASER MACHINING APPARATUS", by R. A. Miller and G. D. Bucher, Ser. No. 414,264; filed 9/1/82;

(3) "APPARATUS AND METHOD FOR LASER MACHINING IN NON-REACTIVE ENVIRONMENT", by R. A. Miller and G. G. Lessman, Ser. No. 414,242; filed 9/1/82;

(4) "STRAP AND VANE POSITIONING FIXTURE FOR FUEL ROD GRID AND METHOD", by R. F. Antol, R. W. Kalkbrenner and R. M. Kobuck, Serial No. 414,197; filed 9/1/82;

(5) "GRID ASSEMBLY FIXTURE, RETENTION STRAP AND METHOD", by R. M. Kobuck and R. W. Kalkbrenner, Ser. No. 414,198; filed 9/1/82;

(6) "LASER MACHINING SYSTEM", by D. L. Wolfe, J. W. Clements and J. S. Kerrey, Ser. No. 414,241; filed 9/1/82;

(7) "MOVABLE MACHINING CHAMBER WITH ROTATABLE WORK PIECE FIXTURE", by R. F. Antol, R. Kalkbrenner and D. L. Wolfe, Ser. No. 414,263; filed 9/1/82;

(8) "WORKPIECE GRIPPING AND MANIPULATING APPARATUS FOR LASER WELDING SYSTEMS AND THE LIKE", by R. Kalkbrenner and R. Kobuck, Ser. No. 414,262; filed 9/1/82;

(9) "WELDING PLATES FOR A FUEL ROD GRID", by R. M. Kobuck, R. Miller, R. W. Kalkbrenner, J. Kerrey and R. Duncan, Ser. No. 414,265; filed 9/1/82;

(10) "PLURAL COMPUTER CONTROL FOR SHARED LASER MACHINING", by J. W. Clements and W. D. Lanyi, Ser. No. 414,204; filed 9/1/82;

(11) "GRID AND SLEEVES WELDING FIXTURE AND METHOD", by J. S. Kerrey and R. Duncan, Ser. No. 414,213; filed 9/1/82;

(12) "CALIBRATION OF AUTOMATED LASER MACHINING APPARATUS" by J. W. Clements and J. R. Faulkner, Ser. No. 414,272; filed 9/1/82; and

(13) "RIGID SUPPORT FOR LASER MACHINING APPARATUS", by D. L. Wolfe, Ser. No. 414,191, filed 9/1/82.

BACKGROUND OF THE INVENTION

1. Field of the Invention:

This invention, in its preferred form, relates to apparatus for laser machining a work piece and more particularly to apparatus for focusing and directing a laser beam onto the work piece. More particularly, this invention relates to apparatus for laser machining work pieces whose focusing elements may be readily cleaned of debris thrown off during the machining of the work piece.

2. Description of the Prior Art:

The precision laser machining apparatus of this invention relates generally to the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assemble 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and, therefore, the orientation of the fuel rods 18 with respect to each other is rigorously controlled.

The precision laser welding apparatus of this invention is, in one illustrative embodiment thereof, related to the manufacture of fuel rod grids 16 as shown in FIGS. 2A to 2C. The fuel rod grid 16 is of an approximately square configuration, whose periphery is formed by four outer grid straps 22. Each end of an outer grid strap 22 is welded by a corner seam weld 30 to the end of a perpendicularly disposed outer grid strap. A plurality of inner grid straps 20 is disposed in rows and columns perpendicular to each other, whereby a plurality of cells are formed to receive the control rods and the nuclear fuel rods 18. The inner grid straps 20 disposed along the rows and columns have complementary slots therein at each of the points 24 of intersection for receiving a perpendicularly disposed inner grid strap 20. An intersect weld 32 is formed at each of the points 24 of intersection, whereby a rigid egg crate structure is formed. Further, each of the inner grids straps 20 includes at each end a pair of tabs 26 of a size and configuration to be tightly received in either a top or bottom row of slots 28 formed in the outer grid straps 22, as shown in FIG. 2A. A slot and tab weld 34 is effected along the top and bottom rows formed by the slots 28 within the outer grid straps 22. The bent ends of the outer grid straps 22 are welded together by corner seam welds 30. Further, a plurality of guide sleeves 36 is disposed on the sleeve side surface of the fuel rod grid 16 to receive and guide the control rods disposed therein. A series of notch seam welds 40 securely attaches the guide sleeves 36 to corresponding notches 38 formed within the inner grid straps 20. The precision laser welding apparatus of this invention is particularly adapted to perform a series of controlled welding operations whereby each of the welds 30, 32, 34 and 40 is carried out. The precision laser welding apparatus of this invention not only controls the various parameters of generating the laser in terms of the pulse width, the pulse height of each laser pulse, and the number of pulses to be applied to each weld, but also controls the sequential positioning of the fuel rod grids 16 with respect to the laser beam. It is understood that after each such weld, the fuel rod grid 16 is repositioned and/or the focal point of the laser beam changed to effect the particular type of weld desired.

Referring now to FIGS. 2B and 2C, the plurality of resilient fingers 44 is disposed longitudinally of the inner grid straps 20 in a parallel relationship to each other. A pair of spacing fingers 46 is disposed on either side of a corresponding resilient finger 44 and serves along with the resilient finger 44 to provide a resilient grip of the nuclear fuel rods 18 that are disposed within the cell formed by the intersecting inner grid straps 20. A resilient finger 44a is disposed to the right as seen in FIG. 2C in an opposing relationship to the spacing finger 46a, whereby a nuclear fuel rod 18 is resiliently held therebetween.

The fuel rod grid 16 is machined and in particular welded. In order to perform the intersect welds 32, the fuel rod grid 16 is incrementally moved along each of its X and Y axes, stopping at each of a plurality of positions wherein the laser beam is aligned with each of the intersections of the inner grid straps 20. Once positioned, a laser source is energized to emit a laser beam onto the aligned point of intersection to thereby effect an intersect weld 32. Thereafter, the fuel rod grid 16 is moved to the next position and another intersect weld 32 is made. The slot and tab welds 34, as well as the corner seam welds 30, are made by rotating the fuel rod grid 16 about its Y axis so that each of its outer grid straps 22 is presented to the laser beam for welding. In addition, notch seam welds 40 securing the guide sleeves 36 within the notches 38 of the inner grid straps 20 are carried out by rotating the fuel rod grid 16 to a position disposed at an angle of 45° with respect to the laser beam to thereby expose the interface between the guide sleeves 36 and the slots 38 to the laser beam. It is contemplated by this invention that the laser beam is initially focused to perform the intersect welds 32 as are carried out within a single plane in which the intersect welds lie. In order to make the corner seam welds 30 and the slot and tab welds 34, it is necessary to rotate the fuel rod grid 16 out of the plane of the intersect welds 32, thus requiring the refocusing of the laser beam. In similar fashion, the fuel rod grid 16 is rotated from the plane of the intersect welds to its 45° angle position with respect to the laser beam, thus also requiring a refocusing of the laser beam before precision welding may be carried out.

As described in the copending application entitled "APPARATUS AND METHOD FOR LASER MACHINING IN NON-REACTIVE ENVIRONMENT" Ser. No. 414,242 filed 9/1/82, the fuel rod grid 16 is made of a volatile material in the form of the zirconium alloy known as Zircaloy. The fuel rod grid 16 is machined and in particular welded in an environment of an inert gas to avoid contamination of the welds as would occur if the welding were to take place in the presence of a reactive medium such as oxygen or water. The danger of contaminated welds is well recognized in the art especially where the welded structure such as the fuel rod grid 16 is to be used in a hostile environment as found within a nuclear fuel reactor. Such an environment subjects the welds to relatively high temperatures in the presence of a flowing coolant such as water, whereby any weld contamination is aggravated leading to the eventual failure of the welds. In this particular example, the failure of a weld removes the structural support maintaining the spacing of the fuel rods 18, whereby the fuel rods 18 are subject to intense vibrations due to the high rate of flow of the coolant. As a result, the fuel rods 18 will rupture with the subsequent release of their uranium oxide into the coolant. Thus, it is important to carry out the machining and in particular the welding in an inert environment, while at the same time permitting the movement of the fuel rod grid 16 in three dimensions and to permit the refocusing of the laser beam onto the fuel rod grid 16 to effect different types of welds as explained above.

U.S. Pat. No. 3,422,246 of Wetzel and U.S. Pat. No. 4,190,759 of Hongo et al., disclose laser machining apparatus wherein there is relative movement between the laser source in at least X and Y dimensions with respect to a laser beam. The Hongo et al. patent particularly discloses the use of X and Y tables for receiving the work piece, i.e. a semi conductor substrate, and of a scanner for rotating the laser beam as directed onto the work piece. However, there is no disclosure within the Hongo et al. patent of machining within a non-reactive environment or of the refocusing of the laser beam because the work piece is displaced from the X and Y axes along which it is moved. The Wetzel patent discloses a platform for receiving the work piece to be machined, i.e. cut, while the laser source is moved along a Y axis transverse to the X axis. A complex beam manipulating mechanism is suggested, whereby the beam is shaped rectangularly and then rotated to maintain an edge of the rectangular beam configuration aligned with respect to the movement of the work piece.

U.S. Pat. No. 4,027,137 of Liedtke and Kelly U.S. Pat. No. 4,162,390 relate to the laser machining of a work piece in a controlled environment. The Liedtke patent suggests an assembly for supporting a spring loaded metal nozzle that engages the work piece to be welded and means for directing a jet of forced air onto the nozzle, whereby debris from the laser drilling is removed from the nozzle. To this end, the area immediately surrounding the nozzle is evacuated by a vacuum pump to further remove the drilling debris. The Kelly patent discloses a similar chamber, whereby a gas stream is directed into a chamber whose environment is controlled and is evacuated by a vacuum pump. The chamber includes a light transmitting mirror through which a laser beam is directed onto the work piece. In particular, the stream of a gas such as argon is directed onto the light transmitting mirror to remove the welding debris therefrom.

A particular problem related to this invention involves the attenuation of the laser beam by debris thrown off in the course of the laser welding of the fuel rod grid 16. As will be described below, the laser beam is focused by a lens that is disposed in close proximity to the fuel rod grid 16 to be welded and is coated during the welding by the debris thrown off from the fuel rod grid 16. Thus, the debris coating upon the lens tends to attenuate the intensity of the laser beam and thus the power imparted to a weld. It is necessary to periodically clean the laser lens quickly, while permitting the laser lens to be reinserted within the path of the laser beam at a precise point to ensure precision focusing of the laser beam.

SUMMARY OF THE INVENTION

It is therefore an object of this invention to provide a new and improved laser machining apparatus wherein the lens for focusing and directing the laser beam is readily removable to be cleaned of any machining debris collected thereon during the machining process.

It is a more particular object of this invention to provide a new and improved laser machining apparatus including a laser lens that is releasably mounted with respect to the work piece in a manner to insure its repositioning in precise fashion with respect to the work piece.

It is a still further object of this invention to provide a new and improved laser machining apparatus that facilitates the mounting of a visible light source to permit illumination of the work piece.

In accordance with these and other objects of the invention, there is provided apparatus for laser machining a work piece comprising a laser lens adapted to be releasably mounted to permit cleaning of the lens to remove any debris collected thereon during laser machining. The mounting includes a cylindrical base for defining a path along which the laser beam emitted by the laser source is directed onto the work piece, and a mounting member for mounting the laser lens with respect to the cylindrical base and adapted to be removably mounted on the cylindrical base in a manner whereby the lens is disposed to a certain position with respect to the cylindrical base. To this end, there is included a locking member engaging the cylindrical base and biasing the mounting member and its laser lens to the certain position with respect to the cylindrical base.

In an illustrative embodiment of this invention, the locking member includes at least one groove therein engageable with a corresponding pin affixed to the cylindrical base and disposable within said groove. Upon the movement and in particular the rotation of the locking member in a first direction, the pin engages the groove of the locking member to couple the mounting member with the cylindrical base and to bias the laser lens to its certain position.

In a further aspect of this invention, the mounting member includes at least one passageway formed therein through which a gas is pumped to form a gaseous jet directed onto the laser lens tending to remove any debris that is formed thereon during machining. Illustratively, the mounting member may include an annulus in communication with each of a plurality of passageways, whereby the gaseous flow directed to the annulus passes through each of the plurality of passageways to form a like plurality of gaseous jets directed onto the laser lens.

In a still further feature of this invention, a lamp is mounted upon the mounting member to direct visible radiation onto the work piece, whereby the work piece may be aligned with respect to the laser beam and including an electrical connector including male and female portions mounted on opposing ones of the locking member and the cylindrical base to provide electrical energization to the lamp. In a further aspect of this invention, a retaining mechanism in the form of a dowel and corresponding opening is disposed upon corresponding ones of the locking member and the cylindrical base to prevent the rotation of the mounting member once the male and female portions of the electrical connector have been connected while permitting the rotation of the locking member to dispose the laser lens to its certain position.

BRIEF DESCRIPTION OF THE DRAWINGS

A detailed description of a preferred embodiment of this invention is hereafter made with specific reference being made to the drawings in which:

FIG. 1 is a perspective view of a nuclear fuel bundle assembly incorporating a plurality of grids made in accordance with the teachings of this invention;

FIGS. 2A–2C are respectively a perspective view, a plan view and a sectioned side view of a fuel rod grid made in accordance with the teachings of this invention and incorporated into the assembly of FIG. 1;

FIG. 3 is a perspective, schematic representation of the laser system for generating and for directing on a time shared basis a laser beam emitted from a single laser source to each of two work pieces, e.g. nuclear fuel rod grids;

FIG. 7 is a schematic diagram of an argon supply system, whereby a suitable inert gas, e.g. argon, is supplied from a tank thereof to each of the welding chambers and laser focusing lens assemblies.

DESCRIPTION OF THE PREFERRED EMBODIMENT

Figure 4:
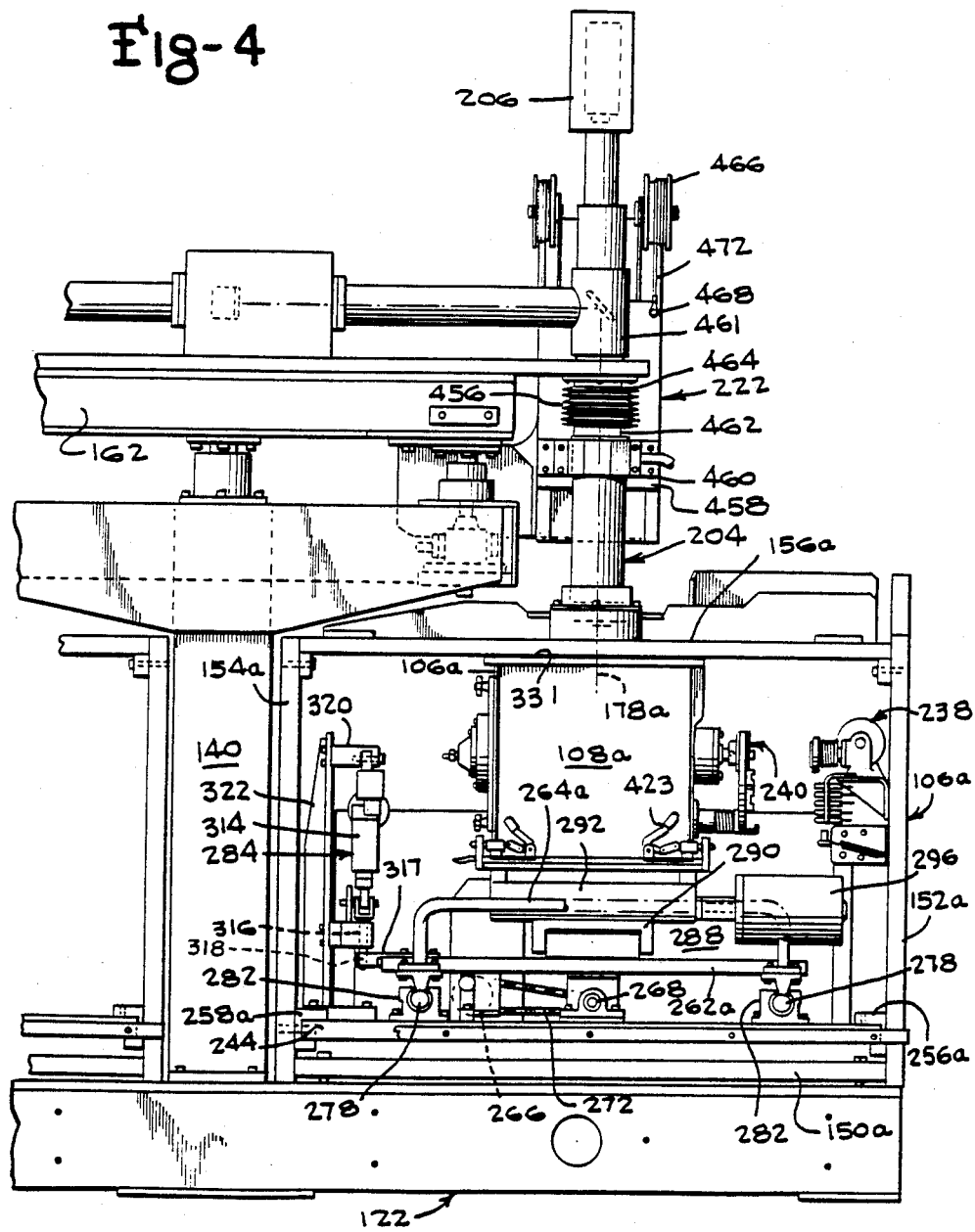
FIG. 4 is a partial, front elevational view of the laser welding system as shown in FIG. 3.

The fuel rod grids 16 are comprised as described above of the inner and outer grid straps 20 and 22 that are assembled and welded together as shown in FIGS. 2A to 2C. Each of the grid straps 20 and 22 is punched from a continuous roll of slit material and accumulates some surface oil in the punching operation. The oil film is cleaned and thereafter, the strap is annealed and then assembled into a work fixture as described in copending application entitled "GRID ASSEMBLY FIXTURE, RETENTION STRAP AND METHOD" Ser. No. 414,198 filed 9/1/82. Thereafter, the grid 16 and fixture are welded by the laser welding system 102 of this invention which carries out each of the intersect welds 32, the corner seam welds 30, the slot and tab welds 34, and the notch seam welds 40 in a pure atmosphere of an inert gas. The fuel rod grid 16 is moved along its X and Y axes, which define a plane, in a sequence of incremental moves to position each intersection of the inner grid straps 22 beneath a laser beam 178, as shown in FIG. 3. After each of the intersect welds has been completed, the fuel rod grid 16 is rotated about its Y axis to present the surface of each outer grid strap 22 to the laser beam 178. While the pulsed laser beam 178 is directed onto the outer grid straps 22, an X-Y positioning system 288 as shown in FIG. 4 moves the fuel rod grid 16 along its X axis to permit the laser beam 178 to make each of the corner seam welds 30 and the slot and tab welds 34. A B axis rotation drive 238 as shown in FIG. 4 is engagable with a rotational fixture 242 for receiving the fuel rod grid 16, as shown in FIG. 3, and is actuatable to rotate the fuel rod grid 16 from a first position wherein the upper surface of the fuel rod grid 16 is disposed substantially perpendicular to the laser beam 178, to a second position, wherein the top surface of the fuel rod grid 16 is disposed at substantially 90° with respect to its first position and the surface of the outer grid strap 22 is disposed substantially perpendicular to the laser beam 178. The B axis drive 238 is also actuatable to move the rotatable fixture 242 and the fuel rod grid 16 is mounted thereon to a third position, wherein the top surface of the fuel rod grid 16 is disposed at an angle of 45° with respect to its original position, whereby the laser beam 178 may be directed onto the interface between each of the notches 38 (see FIGS. 2A and 2C) as formed in the inner grids straps 20, and the guide sleeve 36 disposed therein, to effect the notch seam welds 40. In particular, the X-Y positioning system 288 moves the fuel rod grid 16 along its Y axis to make the notch seam weld 40. The step by step process of making each of the intersect welds 32, the corner seam welds 30, the slot and tab welds 34 and the notch seam welds 40 is more specifically described in the copending applications entitled "FUEL GRID WITH SLEEVES WELDED IN NOTCH GRID STRAPS" Ser. No. 414,232 filed 9/1/82 and entitled "GRID ASSEMBLY FIXTURE, RETENTION STRAP AND METHOD" Ser. No. 414,198 filed 9/1/82.

As shown in FIG. 3, the laser system 102 may, in one illustrative embodiment of this invention, take the form of that laser system manufactured by Raytheon under their model designation number SS500. The laser system 102 includes a laser rod 170 illustratively taking the form of a Nd:YAG crystal laser and a pair of linear krypton flash lamps disposed in a high efficiency, laser head. The laser head includes a total reflecting mirror 182 and a partial reflecting mirror 184 disposed on either end of the laser rod 170. An innercavity shutter 188 is disposed between the laser rod 170 and the total reflecting mirror 182 and is selectively controlled to release a selected number of lasing pulses, whereby the energy imparted to effect laser welding may be precisely controlled in a manner to be explained below. The laser head is modularly constructed to permit all optic elements thereof including the laser rod 170, the excitation lamps 186 and the mirrors 182 and 184 to be easily and independently replaced. The excitation lamps 186 shall be quickly replaced without disturbing the optical alignment. Further, the excitation of flash lamps 186 are water cooled over their entire length, including their end connectors. Lamp triggering provides for parallel pulsing of the excitation lamps 186 by energizing the cavity. The laser rod 170 shall illustratively be selected such that 400 watts average power is obtained at the work piece with the input power to the pulse forming network not to exceed 18 KW when operating at pulse widths of 6 ms and 2 ms and pulse rates of 20 Hz and 50 Hz respectively. A dump shutter 190 is disposable in a first position to direct the laser beam 177 along a diverted path 196 into a beam absorber 194 during those periods in which the work pieces in the form of the fuel rod grids 16 are being changed within the chambers 108. An actuating mechanism 192 is shown for disposing the shutter 190 from its first beam intercepting position to a second position, wherein the beam 177 is focused by a beam expander lens assembly 198 to a beam directing mechanism comprised of a movable beam switching mirror 172 and the stationary mirror 174. When the switching mirror 172 is disposed to intercept the laser beam 177, it is diverted along path 178a to the vertically directing mirror 176a to be directed vertically. The laser focusing lens assembly 204a intercepts and focuses the laser beam 178a onto the fuel rod grid 16 within the chamber 108a. As shown, the laser focusing lens assembly 204, as will be described in detail later, includes a lens 202 and a lens carrier tube 200 as rectilinearly positioned by the Z-axis laser assembly 222, as shown in FIG. 4. When the reflecting mirror 172 is rotated by the motor 175 from a position intercepting the laser beam 177, it is diverted by the stationary reflective mirror 174 to form the laser beam 178b as directed by the vertically directing mirror 176b towards the welding chamber 108b.

The excitation lamps 186 are energized by a power supply. The power supply 120 (which is not part of the hereinafter claimed invention, but is shown in FIG. 4 of previously incorporated-by-reference U.S. patent application Ser. No. 414,191) illustratively comprises a voltage regulated DC power supply which charges a pulse forming network (PEN) through a charging inductor. The related CNC 126 ("Computer Numerical Control" system which is not part of the hereinafter claimed invention, but is shown in FIG. 4 of previously incorporated-by-reference U.S. patent application Ser. No. 414,191) alternately closes switches (silicon controlled rectifiers) that charges the PFN from the DC power supply reservoir capacitator bank and discharges the PFN into the excitation lamps 186 to thereby excite the laser rod 170 to emit a series of laser pulses. The excitation lamps 186 shall operate in a "simmer" mode of operation, in which the lamps 186 are operated at a low DC current level below lasing threshold, and high current pulses are superimposed on the simmer current for generating laser pulses. The PFN shall provide pulses of 2 ms and 6 ms.

To assist in the initial alignment of the weld chamber 108 and, in particular, the fuel rod grid 16 with respect to the laser beam 178, there is provided means for sighting the grid 16 and, in particular, to determine its exact position with respect to the laser beam 178 in the form of an alignment TV camera 206 that is aligned to establish an image path 214 coinciding with the path of the laser beam 178a. As shown in FIG. 3, the image path 214 is focused by a lens 210, selectively passed by a Bureau of Radiological Health (BRH) or safety shutter 212 and directed through the partially transmissive mirror 176 to the TV camera 206. The lens 202 in addition to focusing the laser beam 178 onto the fuel rod grid 16, also focuses with the assistance of lens 210 the image of the grid 16 onto the TV camera 206. As will be explained below, the laser focusing lens assembly 204 also includes an illuminating lamp that is selectively energized to illuminate the grid 16 for alignment purposes. The BRH shutter 212 is selectively opened and closed to permit alignment of the grid 16 with respect to the laser beam 178, remaining closed during all other periods as a safety measure.

As illustrated in FIG. 3, each of the welding chambers 108 may be moved from a first, welding position as shown in the dotted line to a second, out position. When the welding chamber 108 is in its second position, the laser beam 178 is directed by its vertically directing mirror 176 onto a power measuring device or thermopile 218, as supported within a shield tube 216. As will be shown later, the shield tube 216 is mounted on a rearward portion of the welding chamber 108 and includes a restricted opening 220 whereby the laser beam 178 may be effectively confined within the shield tube 216. Periodically, the welding chamber 108 is disposed to its second, out position and the laser beam 178 is directed onto the thermopile 218 to provide an indication of the power output of the laser rod 170 actually impinging onto the fuel rod grid 16. Under the heavy duty load imposed upon the laser system 102, it is contemplated that the laser efficiency will attenuate due to the exhaustion of the laser rod 170 and/or its excitation lamps 186, as well as due to the presence of smoke and debris given off during the laser welding. Thus, in order to provide accurate, reproducible welds, the reservoir voltage applied to the excitation lamps 186 is increased over the life of the laser system 102 dependent upon the thermopile measurements.

Referring now to FIG. 4, there is shown a slide table 262 that permits the welding chamber 108 to be removed from its first welding position, wherein the laser beam 178 is directed into the welding chamber 108, to its second, out position, wherein the machine operator may remove the fuel rod grid 16 from the welding chamber 108. To this end, a slide table 262 is mounted upon an accurately positioned X-Y platform 244 to be positively driven by a slide drive motor 266 in a rectilinear fashion between its first, welding position and its second, out position with respect to the cabinet 104 (which is not part of the hereinafter claimed invention, but is shown in FIG. 4 of previously incorporated-by-reference U.S. patent application Ser. No. 414,191). The slide table 262 includes a safety rail 264 that protrudes in advance of the leading edge of the slide table 262 to prevent operator injury. The slide drive motor 266 is coupled by a drive chain 272 to a screw drive 268, for rectilinearly driving the slide table 262.

As shown in FIG. 4, means are shown for accurately positioning the X-Y platform 244 and therefore the welding chamber 108a in its first, welding position within its positioning module 106a and in its second, out position. It is critical that the welding chamber 108 and in particular, its fuel rod grid 16 be disposed accurately with respect to the laser beam 178. To this end, a front locator assembly 284 selectively directs its locator pin 316 from a first, withdrawn position, to a second, locking position, wherein it is disposed within an opening 318 of a positioning member 317 fixedly attached to the slide table 262 to thereby precisely position the slide table 262 with respect to the laser beam 178. A similar positioning member (not shown) is disposed at a rearward portion of and is fixedly attached to the slide table 262 to engage the locator pin 316 of the front locator assembly 284, to thereby position and hold the slide table 262 and therefore the welding chamber 108 in its second, out position. Though not shown, there is also included a back locator assembly that is fixedly secured with respect to positioning module 106 for actuating a similar locator pin to engage and hold the slide table 262 in its first welding position. It is understood that the front locator assembly 284 and the back locator assembly engage the slide table 262 to dispose the slide table 262 and its welding chamber 108 with the fuel rod grid 16 therein, in a fixed position with respect to the laser beam 178, whereby precision machining may be carried out upon the fuel rod grid 16. The front and back locator assemblies may illustratively take the form of plunger mechanisms as manufactured by DeStaco.

As shown in FIG. 4, each of the positioning modules 106 includes means for precisely positioning the welding chamber 108 and, in particular, the fuel rod grid 16 contained therein in a plurality of precisely controlled position along X and Y axes of a plane, as well as to rotate that plane at a precisely controlled angle about the Y axis, whereby a variety of welds may be effected by the laser beam 178. The X-Y positioning system 288 is disposed as being mounted upon the slide table 262 for supporting and positioning the welding chamber 108. The X-Y positioning system 288 includes an X positioning table 290 and a Y positioning table 292 mounted thereon. The X and Y positioning tables 290 and 292 may illustratively take the form of that mechanism as manufactured by the Shaum Manufacturing Company under their product number DC1212. The X positioning table 290 serves to move the chamber 108 in a direction substantially perpendicular to the plane of FIG. 4, whereas the Y positioning table 292 moves the chamber 108 along a direction perpendicular to the surface of a side 152 of the positioning module 106. The Y positioning table 292 is associated with a Y drive motor 296 that includes a resolver and tachometer, whereby precise incremental distances may be imparted to the welding chamber 108. Similarly, the X positioning table 290 is associated with an X drive motor, resolver, and tachometer (not illustrated).

The B axis rotation drive 238 as generally shown in FIG. 4 is engageable with the welding chamber 108 and in particular with a fixture 242 as rotatably mounted within the welding chamber 108 to rotatably position the fuel rod grid 16 with respect to the laser beam 178, as shown in FIG. 3. It is understood that the fuel rod grid 16 is attachable to the rotatable fixture 242, whereby it may be rotatably disposed about the Y axis. The operation and structure of the X-Y positioning system including its X positioning table 290 and Y positioning table 282 and associated drive motors, the slide table 262 and its slide drive motor 266, and the B axis rotation drive 238 and the rotatable fixture 242 are fully described in the copending application entitled "MOVABLE MACHINING CHAMBER WITH ROTATABLE WORK PIECE FIXTURE" Ser. No. 414,263 filed 9/1/82.

Figure 5:
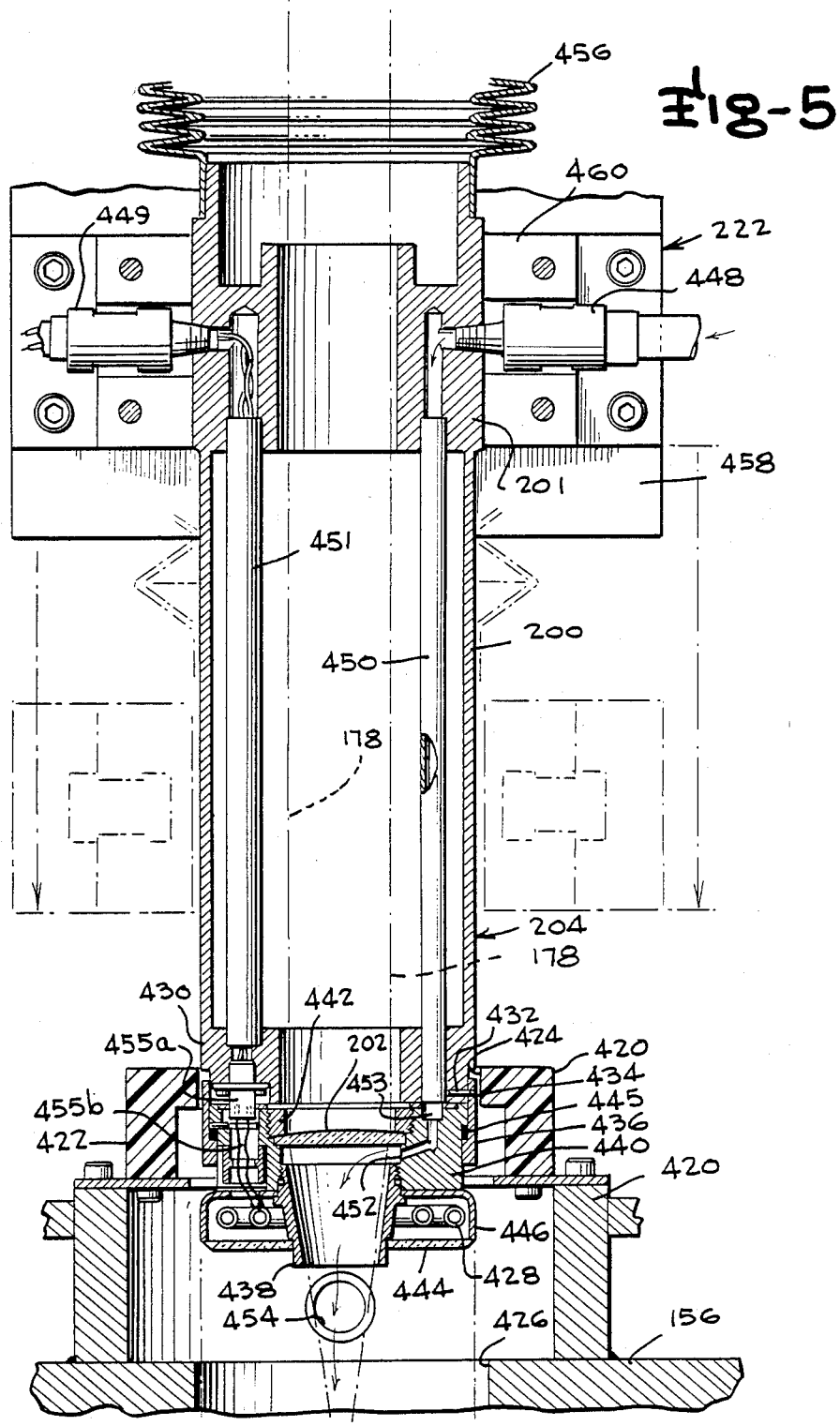
FIG. 5 is a sectioned view of the laser focusing lens assembly as shown generally in FIG. 3.

Referring now to FIG. 5, there is shown in detail the laser focusing lens assembly 204 as mounted upon the Z-axis laser assembly 222 for movement rectilinearly along the Z-axis to and from the welding chamber 108 and, in particular, its shielding cap 422, to permit refocusing of the laser beam 178 upon the fuel rod grid. The assembly 204 includes the lens carrier tube 200 disposed vertically and aligned concentrically with respect to its laser beam 178. A tube base 430 is disposed at the bottom of and connected to the lens carrier tube 200 for removably receiving a lens mounting member 440. As shown in the detailed drawing of FIG. 5, the mounting member 440 is configured to receive a locking ring 436 having a plurality of helical grooves 434, e.g. 3, disposed to receive a corresponding plurality of lock pins 432. Upon rotation, the locking ring 436 and its mounting member 440 may be locked to the tube base 430. A safety hood 438 is made of conical configuration to direct the focused laser beam 178 onto the work piece and has a threaded peripheral portion for engaging a set of threads upon the inner peripheral portion of the mounting member 440. In similar fashion, the lens 202 is supported within a central opening of a mounting member 440 and is retained therein by a retaining ring 442 being peripherally threaded to engage a set of threads upon the mounting member 440, whereby the retaining ring 442 may be screwed onto the mounting member 440 to releasably retain the focusing lens 202.

The safety hood 438 is disposed through an opening within a lamp hood 446 to affix the hood 446 to mounting member 440. A pair of quartz-halogen lamps 428 is disposed within the lamp hood 446 to illuminate the work piece thus permitting alignment of the work piece with respect to the Z-axis or laser beam 178. The operating temperature of the lamps 428 prevents welding debris from collecting thereon. As will be described in detail below, the operator aligns the work piece with respect to the laser beam 178 by viewing a CRT displaying the image as taken by the TV camera 206, whereby the operator may place its electronic rectical associated with the TV camera 206 on an initial weld site to determine an offset between a home position and the sited, first weld site; this offset is then automatically incorporated into the control signals as applied to the X-Y positioning system 288, whereby each of the welds is precisely positioned with respect to the laser beam 178. The lamps 428 are energized by wires directed to the lens hood 446 via an electrical input port 449 as inserted into a tube mounting portion 201 and a conduit 451 leading from the portion 201 to the tube base 430. In similar fashion, a flow of the inert gas, e.g. argon, is introduced into the space formed by the safety hood 438 and the lens 202 by an argon input port 448 threadably attached within an opening of the tube mounting portion 201 and therefrom via a conduit 450 leading to the mounting member 440. The mounting member 440 has an argon jet formed in alignment with the conduit 450, whereby the flow of argon is formed into a jet directed into the hood 438, whereby debris or contaminants as emitted during the welding process will be effectively removed so as not to attenuate the laser beam 178 focused onto the work piece. As seen in FIG. 5, the flow of argon escapes from the safety hood 438 into the space confined by the shielding ring 420 and the cap 422 to be exhausted via an output port 454.

Figure 6A:
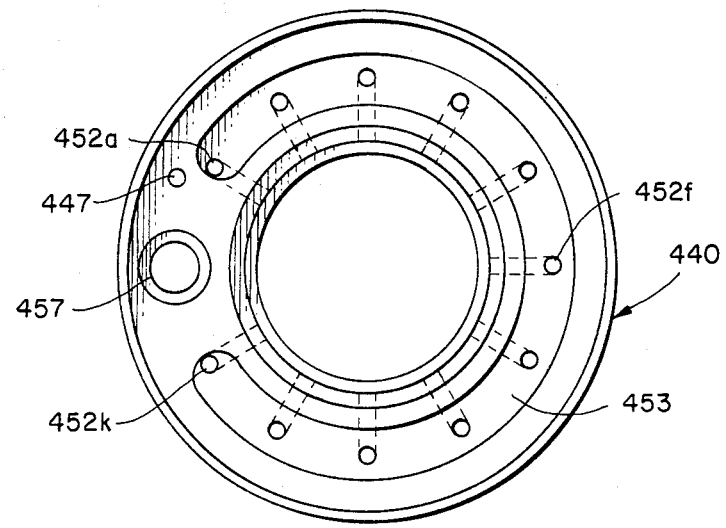
FIGS. 6A and 6B are respectively a plan view of the mounting member, and a partially broken away side view of the locking ring as shown in FIG. 5.

Referring now to FIG. 6A, there is shown a detailed plan view of the mounting member 440 as generally shown in FIG. 5. In particular, there is shown an annulus 453 formed in a top surface of the mounting member 440 and extending more than 270° about the circumference of the mounting member 440 to receive argon gas from the conduit 450 and to distribute the argon gas to each of a plurality of passageways 452a–k, which are in communication with the annulus 453. Argon gas is directed through the conduit 450, the annulus 453 and to each of the passageways 452 to be directed onto the lens 202 to thereby inhibit the coating of the laser lens 202 with welding debris. Further, an opening 457 receives a male portion 455b of an electrical connector 455 to permit mating thereof with a female portion 455a as mounted upon the tube base 430 as shown in FIG. 5. The mounting member 440 may be readily detached from the tube base 430 to permit cleaning of the laser debris form the laser lens 202. Upon reassembly, the mounting member 440 is aligned with the tube base 430 such that the male and female portions of the electrical connector 455 are aligned with each other to permit the application of electrical energy to the quartz lamps 428. To assist in the connector alignment, a dowel pin 447 is affixed to the upper surface of the mounting member 440 such that when the mounting member 440 is axially pressed against the tube base 430, the dowel pin 447 is disposed within a tightly fitting opening (not shown) within the tube base 430, whereby the rotative forces applied to the locking ring 436 will not be transmitted to the electrical connector 455.

Figure 6B:
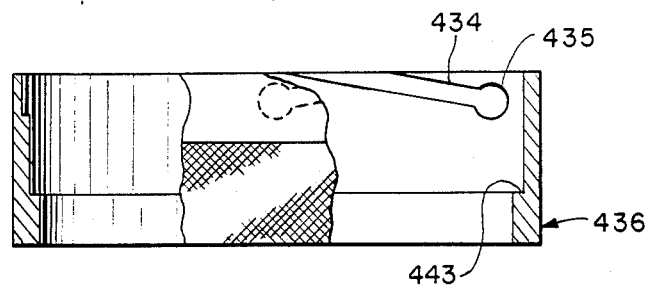

In FIG. 6B, there is shown a side view of the locking ring 436 illustrating more clearly the helical groove 434 machined in an edge thereof. As evident from FIG. 5, the locking ring 436 secures the mounting member 440 with respect to the tube base 430 and is releasably attached thereto to permit the removal of the mounting member 440 and the cleaning of the laser lens 202. The locking ring 436 is rotated in a first direction so that its three grooves 434 engage a like plurality of equally spaced lock pins 432. As the locking ring 436 is rotated in the first direction, the locking ring 436 is drawn axially upward as shown in FIG. 5, thus disposing the laser lens 202 to its correct position. It is understood that the precise positioning of the laser lens 202 is necessary to effect the precision welding of the fuel rod grid 16. As the locking ring 436 is rotated in the first direction, the lock pin 432 is moved downwardly into the groove 434 arriving at the end of the groove 434 that has been slightly enlarged to form a detent opening 435 of critical dimension. A plurality of "O" rings 445 are disposed between a flange 443 of the locking ring 436 and an extruding portion of the mounting member 440 to provide means for resiliently biasing the lock pins 432 into there respective detent openings 435. The detent openings 435 have been carefully machined so that upon rotation of the locking ring 436 to its furthermost position in the first direction, that each lock pin 432 is disposed within its detent opening 435 and is biased by the "O" rings 445 downwardly so that the lock pin 432 engages the top most surface of the detent opening 435, whereby the lens 202 is precisely and repeatably positioned with respect to the tube base 430. In this manner, the mounting member 440 may be repeatedly removed so that the laser lens 202 may be periodically cleaned, and then reattached to the tube base 430 so that the laser lens 202 is precisely repositioned therewith.

The lens carrier tube 200 and in particular the tube mounting portion 201 is mounted by a mounting assembly 460 on the Z-axis laser assembly 222 as more fully shown in FIG. 4. A bellows 456 is secured to the topmost portion of the lens carrier tube 200 to provide shielding of the laser beam directed therethrough, while permitting the Z-axis laser assembly 222 to move the laser lens assembly 204 rectilinearly along the path of the laser beam 178 as shown in dotted line in FIG. 5. In this fashion, the lens 202 may be variably disposed along the Z-axis to permit precise focusing of the laser beam 178 onto the work piece whose position may be changed with respect to laser beam 178, as by rotating the rotatable fixture 242 to effect the notch seam weld 40.

As shown in FIG. 4, the expandable bellows 456 is connected to the topmost portion of the lens carrier tube 200 and to a protective housing 461 by a bellows adapter 464. The Z-axis laser assembly 222 includes a Z-axis table 458 upon which the laser focusing lens assembly 204 is mounted by the lens mounting assembly 460, and is incrementally, selectively driven by a Z-axis drive motor (not shown). In a manner similar to the X and Y drive motors, the Z-axis drive motor also includes a resolver and a tachometer to provide output signals indicative of the precise position of the Z-axis table 458, as well as its speed of movement. The Z-axis motor (not shown) is mechanically coupled to the Z-axis table 458 to rectilinearly move the Z-axis table 458 along its Z-axis. In this manner, the laser lens assembly 204 as shown in detail in FIG. 5, may be repositioned to precisely focus the laser beam 178 onto the fuel rod grid 16. The Z-table 458 is mounted in a vertical position thereby imposing a force upon the Z-axis drive motor which is counterbalanced by a pair of spring powered reels 466 that are coupled respectively by cables 472 disposed about the reels 466 and secured to the Z-axis table 458 by a suitable securing means. The Z-axis table 458 may in one illustrative embodiment of this invention take the form of a table as manufactured by Design Components, Inc., under their designation SA100. The coupling between the Z-axis drive motor and the Z-axis table 458 may illustratively take the form of those components manufactured by Shaum Manufacturing, Inc. under their designations "Heli-Cal" Nos. 3477-16-8 and 5085-8-8. The Z-axis drive motor may illustratively take the form of that DC servo controller as manufactured by Control Systems Research, Inc., under their designation SM706RH.

An argon supply system 473 is shown in FIG. 7 for providing a flow of a suitable inert gas, e.g. argon, to the welding chamber 108 and to the laser lens assembly 204 at selected variable rates. The laser welding of volatile materials such as Zircaloy, of which the inner and outer grid straps 20 and 22 are made, must be conducted in an inert atmosphere due to the highly reactive nature of Zircaloy to oxygen, nitrogen, and water. Welding tests have demonstrated that an inert gas flow around the immediate weld area of a work piece does not provide adequate shielding from oxygen and water to produce the desired high quality of welds that will withstand the hostile environment of a nuclear reactor without failure. The argon supply system 473 as shown in FIG. 7 includes the welding chamber 108, as well as the laser focusing lens assembly 204 as particularly shown in FIG. 5. The argon supply system 473 comprises an argon supply tank 474 that is coupled to a flow valve 476 which separates the argon supply tank 474 from the remainder of the system 473. This valve 476 is kept fully open except when it is necessary to shut down the entire system. The argon flows from the tank 474 through the valve 476 to a regulator 478, which establishes the system pressure so as not to exceed a maximum level, e.g. 50 psi. It is contemplated that the flow of argon to each of the welding chambers 108a and 108b and the laser focusing lens assembly 204 will be controlled at a plurality of different rates depending upon whether the grid 16 is being loaded into the chamber 16, the chamber 108 is being purged, or a welding operation is occurring. For example, the purging of the welding chamber 108 requires a relatively high flow rate of the inert gas at which time pressure should not exceed the maximum level. To this end, a relief valve 482 is coupled to a manifold 480 for receiving the gas flow and for distributing it to each of a plurality of mass flow controllers 484, 486, and 488. The mass flow controllers 484, 486, and 488 are respectively connected to the welding chamber 108, to the rotatable fixture 242 and to the laser lens assembly 204. In particular, a controlled rate of gas flow is provided from the mass flow controller 484 via a flexible hose 490 and through a diffuser plate 330 disposed in the bottom portion of the welding chamber 108 to establish a laminar flow of the inert gas within the welding chamber 108. In similar fashion, the gas flow from the mass flow controller 486 is directed through the flexible hose 490 to the argon input port 500, whereby argon is discharged through output ports 506 of the rotatable fixture 242. It is understood that the flexible hoses 490 are provided to permit the free movement of the welding chamber 108 as it is moved into and out of its positioning module 106 by the slide table 262. The flow of gas is directed from the mass flow controller 488 via a flexible hose 490 to the laser lens assembly 204 and in particular to the argon input port 448, whereby argon may be directed via the conduit 450 and a plurality of the jets 452 into that space immediately below the focusing lens 202. This argon flow prevents the submicron oxides produced by the laser welding within the welding chamber 108 from contaminating the lens 202.

The moisture ($H_2O$) sensor 410 is disposed within the welding chamber 108 and is coupled with a moisture monitor 492. The operator and the CNC check the level of moisture within the welding chamber 108 during the purging and welding operations, whereby laser welding may be prohibited if the moisture content is greater than a specified level, e.g. 10 ppm. In addition, an oxygen probe 496 is disposed in the sealing plate 156 for sampling the argon drawn through the peripheral opening between the upper flange 331 (see FIG. 4) of the welding chamber 108 and the sealing plate 156. It is understood that the output of the oxygen probe 496 also serves to provide an indication of the nitrogen content of the air in the chamber 108. The monitoring of the atmosphere in the welding chamber 108 is begun when the welding chamber 108 is disposed to its first, welding position. Each such oxygen probe or monitor 496 includes a calibrating gas inlet so there is a direct flow of gas to the probe 496. The output of the probe 496 is coupled to an oxygen analyzer 494 whose output in parts per million (ppm) may be displayed upon the monitor meter 498. The computer system may be programmed so that the welding sequence will not be initiated until the oxygen level is below a programmed value, e.g. 7 ppm. During welding, the sampling of oxygen is automatically discontinued to avoid contamination of the probe 496 with welding debris.

The argon supply system 473 provides a flow of the inert gas, e.g. argon, at a substantially constant flow rate into the welding chamber 108 to maintain the atmosphere within the chamber substantially pure, i.e. below the limits of oxygen and water contamination as defined above. The flow rate is dependent upon whether the laser welding system 102 and in particular its welding chamber 108 is in its loading and unloading cycle, in its purging cycle, or in its welding cycle. As will be explained, the computer system associated with the welding chamber 108 directly controls the mass flow of controllers 484, 486, and 488 to any one of a plurality of flow rates. In particular, there are four potentiometers for each mass flow controller. The computer system actuates a selected potentiometer to provide the gas flow rate required for each of the loading and unloading, purging and welding cycles. To change the program flow rate, the CNC addresses the potentiometer whereby the operator may then adjust the potentiometer to provide the desired flow rate. The flow will appear on a suitable digital display of the controller. The mass flow controllers are calibrated in standard liters per minute (SLPM).

When opening the welding chamber 108 to load and unload a grid 16, the welding chamber 108 should be slid as upon the slide 262 table with respect to the sealing late 156, rather than swinging the sealing plate 156 open like a door. This sliding technique reduces air/argon turbulence and minimizes the air currents that would otherwise tend to mix the air with the argon in the welding chamber 108. During the load/unloading cycle, argon flow is set at a low rate to maintain the argon atmosphere as pure as possible, typically in the order of 30 CFH. A high flow rate during the load/unload cycle would cause turbulence that would draw air into the welding chamber 108. The loading/unloading of the grid 16 should be accomplished with a mechanical gripping device as described in copending application entitled "WORKPIECE GRIPPING AND MANIPULATING APPARATUS FOR LASER WELDING SYSTEMS AND THE LIKE" Ser. No. 414262 filed 9/1/82. If such a gripping device were not employed, the operator would place his hands onto the chamber 108 thereby increasing the air/argon mixing and introducing additional undesirable moisture into the argon atmosphere.

Immediately prior to the welding cycle and after the welding chamber 108 has been returned to its first, welding position, i.e. beneath the sealing plate 156, the mass flow controllers 484 and 486 are controlled by their CNC to effect a relatively high flow rate of the inert gas in the order of 400 CFH, whereby a welding chamber 108 as shown in FIG. 4 and having approximately square dimensions of 14 by 16 by 16 inches, may be purged to lower the oxygen level to below 10 ppm in approximately one minute.

After the purging cycle has been completed, the laser welding system 102 and in particular its computer system is prepared to initiate the laser welding cycle, during which a substantially lowered gas flow rate as controlled by the mass flow controllers 484 and 486 may be introduced into the welding chamber 108. Also, the weld gas sampling pumps for the oxygen probe 496 are automatically shut off to prevent contamination with welding debris. A relatively low flow rate in the order of 30 CFH has been found sufficient to maintain the welding chamber atmosphere below the levels of the purity defined above. As shown in FIG. 7, the argon gas is introduced into the bottom of the welding chamber 108, and flows through the diffuser plate 330 to produce a laminar gas flow which "floats" the air out of the welding chamber 108. The higher density of argon and the substantially constant flow rate thereof effectively excludes air from the welding chamber 108. The diffuser plate 330 is made of sintered stainless steel fibers with a plate density of approximately 60% and a thickness of 0.125 inch. Further, the diffuser plate 330 covers substantially the entire bottom cross section of the welding chamber 108, with as little non-diffusing supporting structure as possible. As the diffuser area decreases in relation to the cross sectional area of the chamber 108, the time and quantity of argon required to purge the welding chamber 108 of air increases; this is an important consideration when the rapid, high production of grids 16 must be effected. Further, the diffuser plate 330 must be adequately sealed to the sides of the welding chamber 108 so that the incoming argon is forced to diffuse through the plate 330 and not simply bypass the diffuser plate 330 and stream up along the chamber walls.

In like fashion, the laser lens assembly 204 as shown in FIG. 5 need not be tightly sealed with respect to the cap 422. The gap therebetween provides an opening for the argon gas to escape from the welding chamber 108, when a high argon flow is used to purge the welding chamber 108 of air. Since all gases diffuse within each other, a constant flow of gas is especially required during the welding and purging cycles to maintain a pure atmosphere. Although a small gap is preferably required between the chamber 108 and the sealing plate 156, as well as between the cap 422 and the laser lens assembly 204, the rest of the welding chamber 108 must be free of all leaks. While argon is heavier than air and would tend to aspirate out through any such leaks in the chamber 108, air also can aspirate into the chamber 108 through the same hole, thus contaminating the atmosphere of the welding chamber 108.

It is understood that the laser welding system 102 as described above is under the control of a programmed digital computer. Though beyond the scope of this invention, the computer system controls the incremental movement imparted by the X-Y positioning system 288 to the welding chamber 108 and the fuel rod grid 16 disposed therein, and in particular applies discrete control signals to each of the X and Y drive motors as coupled to the X and Y tables of the system 288. In similar fashion, control signals are supplied by the computer system to the slide drive motor mechanically coupled to the slide table 262 to drive it between its first welding position and its second out position. Similarly, the B axis drive 238 is under the control of the computer system, whereby it is engageable with the rotatable fixture 242 to not only sense the position of the rotatable fixture 242, but to move the fixture and the fuel rod grid 16 carried thereby to the correct position for the next welding step. The laser rod 170 and more particularly a power source and a pulse forming network associated with its excitation lamps 186, are also under the control of the computer system to regulate the power level, pulse width and frequency of the voltage supplied to the excitation lamps 186, whereby corresponding laser pulses are directed onto the fuel rod grid 16. The argon supply system 473 as shown in FIG. 7 and, in particular, its mass flow controllers 484, 486 and 488 are coupled to and are under the control of the computer system to effect the desired argon flow rate into each of the welding chambers 108, the rotatable fixture 242 and the laser lens assembly 204. The computer system is fully described in the copending application entitled, "LASER MACHINING SYSTEM" Ser. No. 414241 filed 9/1/82.

Thus, there has been shown a lens assembly for a laser machining apparatus that permits rapid removal of the laser lens for cleaning and remounting of the laser lens in a precise position with respect to the laser source and the work piece to be machined. In this manner, the machining and, in particular, the welding debris thrown off in the process of welding the work piece may be readily removed to thereby prevent significant attenuation of the power level of the laser beam directed onto the work piece. The laser lens assembly is mounted upon a table for movement along the path of the laser beam to thereby permit the laser beam to be refocused as the work piece is moved in a dimension along the laser path. In a further aspect of this invention, the laser lens assembly is associated with a welding chamber for receiving the work piece and for maintaining the work piece in a non-reactive environment. Illustratively, the non-reactive environment is established by directing at specified flow rates an inert gas such as argon into the machining chamber and permitting the gas to escape from the chamber through an opening formed between the chamber and the laser lens assembly at a rate to prevent the introduction of reactive gases into the chamber.

In considering this invention, it should be remembered that the present disclosure is illustrative only and the scope of the invention should be determined by the appended claims.

We claim:

1. Apparatus for laser machining a work piece by precisely directing and focusing a laser beam onto the work piece, said laser machining apparatus comprising:
   (a) a laser lens for focusing the laser beam onto the work piece;
   (b) a cylindrical base for defining a path along which the laser beam passes to the work piece;
   (c) a mounting member for receiving said laser lens adapted to be removably attached to said cylindrical base to permit cleaning of debris thrown off from the work piece during machining;
   (d) means for securing said laser lens to said mounting member; and
   (e) locking means for releasably attaching said mounting member to said cylindrical base and for resiliently biasing said mounting member and therefor also its secured said laser lens so that said laser lens is precisely positioned at a certain position with respect to said cylindrical base.

2. The laser machining apparatus as claimed in claim 1, wherein said releasable locking member includes a resilient member disposed between said cylindrical base and said mounting member for resiliently biasing said laser lens to said certain postion.

3. The laser machining apparatus as claimed in claim 2, wherein said locking means includes a locking ring with detent means for releasably engaging said cylindrical base, and for defining said certain position.

4. The laser machining apparatus as claimed in claim 3, wherein said cylindrical base includes at least one locking pin engageable with said detent means of said locking ring, whereby said resilient member biases said locking ring such that said detent means engages said locking pin to dispose said mounting member and said laser lens at said certain position.

5. The laser machining apparatus as claimed in claim 4, wherein said locking ring includes a groove configured and disposed to receive and cooperate with said locking pin, whereby upon movement of said locking ring in a first direction, said locking pin engages said groove to dispose said mounting member and said laser lens to its certain position.

6. The laser machining apparatus as claimed in claim 1, wherein said mounting member has a passageway formed therein to direct a gaseous flow onto said laser lens thereby tending to prevent the build up of debris thrown off during the machining of the work piece.

7. The laser machining apparatus as claimed in claim 6, wherein said cylindrical base includes a conduit for directing the gaseous flow therealong and aligned with respect to said mounting member to direct the gaseous flow into said passageway.

8. The laser machining apparatus as claimed in claim 7, wherein said mounting member includes an annulus formed therein and disposed to be in communication with said conduit, and there is included a plurality of passageways in communication with said annulus, whereby the gaseous flow received by said annulus is directed into each of said plurality of passageways to form corresponding jets to be directed onto said laser lens.

9. The laser machining apparatus as claimed in claim 4, wherein there is included a lamp mounted on said mounting member for directing visual radiation onto the work piece.

10. The laser machining apparatus as claimed in claim 9, wherein there is included an electrical connector for supplying electrical energization to said lamp, said electrical connector including a female portion mounted upon one of said mounting member and said cylindrical base, and a male portion mounted on the other of said mounting member and said cylindrical base, said male and female portion adapted to be electrically coupled to each other.

11. The laser machining apparatus as claimed in claim 10, wherein said locking ring is rotatively actuated in the first direction whereby said groove engages said locking pin to dispose said mounting member and said laser lens to said certain position, and there is further included retaining means for permitting the connection of said male and female portions of said electrical connector, while preventing the rotative movement of said mounting member with respect to said cylindrical base.

12. The laser machining apparatus as claimed in claim 11, wherein said retaining means comprises a dowel mounted upon one of said mounting member and said cylindrical base, and an opening disposed in the other of said mounting member and said cylindrical base for receiving in close fit said dowel.

13. The laser machining apparatus as claimed in claim 7, wherein said cylindrical base is fixedly disposed upon a table, and there is included drive means mechanically coupled to said table for rectilinearly moving said cylindrical base and said laser lens as coupled thereto to precisely focus the laser beam onto the work piece.

14. The laser machining apparatus as claimed in claim 13, wherein there is included a machining chamber for receiving the work piece, pumping means for directing a flow of a gas non-reactive with respect to the material of which the work piece is made into said chamber, and sealing means between said machining chamber and said mounting member to permit the escape of said gas at a rate to substantially prevent the flow of any reactive gas into said machining chamber.

15. The laser machining apparatus as claimed in claim 14, wherein said pumping means is associated with said conduit to direct the non-reactive gas via said conduit and said passage way onto said laser lens.

16. The laser machining apparatus as claimed in claim 1, wherein said laser lens securing means includes a retaining ring threadably engageable with said mounting member to secure said laser lens thereto.

17. The laser machining apparatus as claimed in claim 2, wherein said resilient member comprises at least one "O" ring made of a resilient material.

* * * * *